United States Patent [19]

Yoshizawa et al.

[11] Patent Number: 5,059,234
[45] Date of Patent: Oct. 22, 1991

[54] SHEET GLASS BENDING APPARATUS

[75] Inventors: Hideo Yoshizawa; Mitsuo Tanaka, both of Osaka, Japan

[73] Assignee: Nippon Sheet Glass Co., Ltd., Osaka, Japan

[21] Appl. No.: 522,249

[22] Filed: May 11, 1990

[30] Foreign Application Priority Data

May 11, 1989 [JP] Japan .................................. 1-118241

[51] Int. Cl.⁵ .......................................... C03B 23/023
[52] U.S. Cl. ........................................ 65/273; 65/287; 65/349
[58] Field of Search ................. 65/273, 287, 106, 104, 65/348, 349

[56] References Cited

U.S. PATENT DOCUMENTS

| | | | |
|---|---|---|---|
| 3,573,889 | 4/1971 | McMaster et al. | 65/273 |
| 3,723,085 | 3/1973 | McMaster | 65/273 |
| 4,185,986 | 1/1980 | Frank | 65/287 |
| 4,339,259 | 7/1982 | Paudice et al. | 65/104 |
| 4,433,993 | 2/1984 | Frank | 65/273 |
| 4,447,252 | 5/1984 | Di Nocco et al. | 65/273 |
| 4,470,835 | 9/1984 | Fecik et al. | 65/106 |
| 4,575,390 | 3/1986 | McMaster | 65/273 |
| 4,662,925 | 5/1987 | Thimons et al. | 65/104 |
| 4,711,654 | 12/1987 | Iida | 65/273 |
| 4,749,399 | 6/1988 | Yamada et al. | 65/273 |
| 4,859,225 | 8/1989 | Kuster et al. | 65/273 |
| 4,883,526 | 11/1989 | Enk et al. | 65/104 |

FOREIGN PATENT DOCUMENTS 237231 9/1987 European Pat. Off. .

Primary Examiner—Joye L. Woodard
Attorney, Agent, or Firm—Merchant, Gould, Smith, Edell, Welter & Schmidt

[57] ABSTRACT

A sheet glass bending apparatus includes a pressing stage disposed downstream of a heating furnace and a quenching stage disposed downstream of the pressing stage. The sheet glass bending apparatus also comprises a lifting/lowering member for vertically moving a ring mold which supports a lower surface of a glass sheet in the pressing stage, and a shuttle reciprocally movable between the pressing stage and the quenching stage while holding the ring mold, the shuttle being operable to receive the ring mold from and transfer the ring mold to the lifting/lowering member.

5 Claims, 4 Drawing Sheets

SHEET GLASS BENDING APPARATUS

BACKGROUND OF THE INVENTION

1. Field of the Invention

The present invention relates to a sheet glass bending apparatus for pressing a sheet of glass, which has been horizontally delivered from a heating furnace, to a bent configuration, and thereafter tempering the bent glass sheet by quenching.

2. Description of the Relevant Art

There are known various sheet glass bending apparatus by which a sheet of glass, which has been horizontally fed from a heating furnace, is pressed to a bent shape and then tempered by quenching. These known sheet glass bending apparatuses are generally classified into two groups. The sheet glass bending apparatus in one group are of the one-stage type in which a sheet of glass is pressed to a bent shape and tempered by quenching in one location. The sheet glass bending apparatus belonging to the other group are of the two-stage type which includes a tempering stage located downstream of a pressing stage.

The two-stage-type sheet glass bending apparatuses are disclosed in Japanese Patent Publication No. 61-44816 published Oct. 4, 1986, Japanese Laid-Open Patent Publication No. 62-270429 published Nov. 24, 1987, and Japanese Patent Publication No. 62-30136 published June 20, 1987, for example.

According to the apparatus shown in the first and second publications, a sheet of glass is pressed to a bent shape between a ring mold, serving as a lower mold, and an upper mold, in or outside of a heating furnace, and then the bent glass sheet is transferred onto another ring mold and fed to a quenching stage.

According to the apparatus disclosed in the third publication, a single ring mold is integrally fixed to a feed jig, which is reciprocally moved between a pressing stage and a quenching stage to move the ring mold between these stages.

The apparatus disclosed in the first and second publications are made up of a large number of parts since different ring molds are employed in the pressing and quenching stages, respectively. When a sheet of glass is transferred from one ring mold to the other, the peripheral edge of the glass sheet tends to be cracked or distorted.

The apparatus shown in the third publication are made up of a relatively small number of parts because one ring mold is shared by the two stages. However, the feed jig to which the ring mold is integrally fixed is liable to become deformed since it is reciprocally moved between the pressing stage which is kept at a higher temperature and the quenching stage which is kept at a lower temperature. Therefore, the ring mold may be deformed by any such deformation of the feed jig.

The present invention has been made in an effort to effectively solve the above problems of the conventional sheet glass bending apparatus.

SUMMARY OF THE INVENTION

It is an object of the present invention to provide a sheet glass bending apparatus which is constructed of a relatively small number of parts and which can prevent a ring mold from being deformed as much as possible.

According to the present invention, there is provided an apparatus for bending a glass sheet, having a pressing stage disposed downstream of a heating furnace and a quenching stage disposed downstream of the pressing stage, the apparatus comprising a ring mold for supporting a peripheral edge of a lower surface of a glass sheet, a lifting/lowering member disposed in the pressing stage, for placing thereon the ring mold and vertically moving the ring mold, and a shuttle disposed between the pressing stage and the quenching stage and reciprocally movable therebetween while holding the ring mold, the shuttle being operable to receive the ring mold from and transfer the ring mold to the lifting/lowering member.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
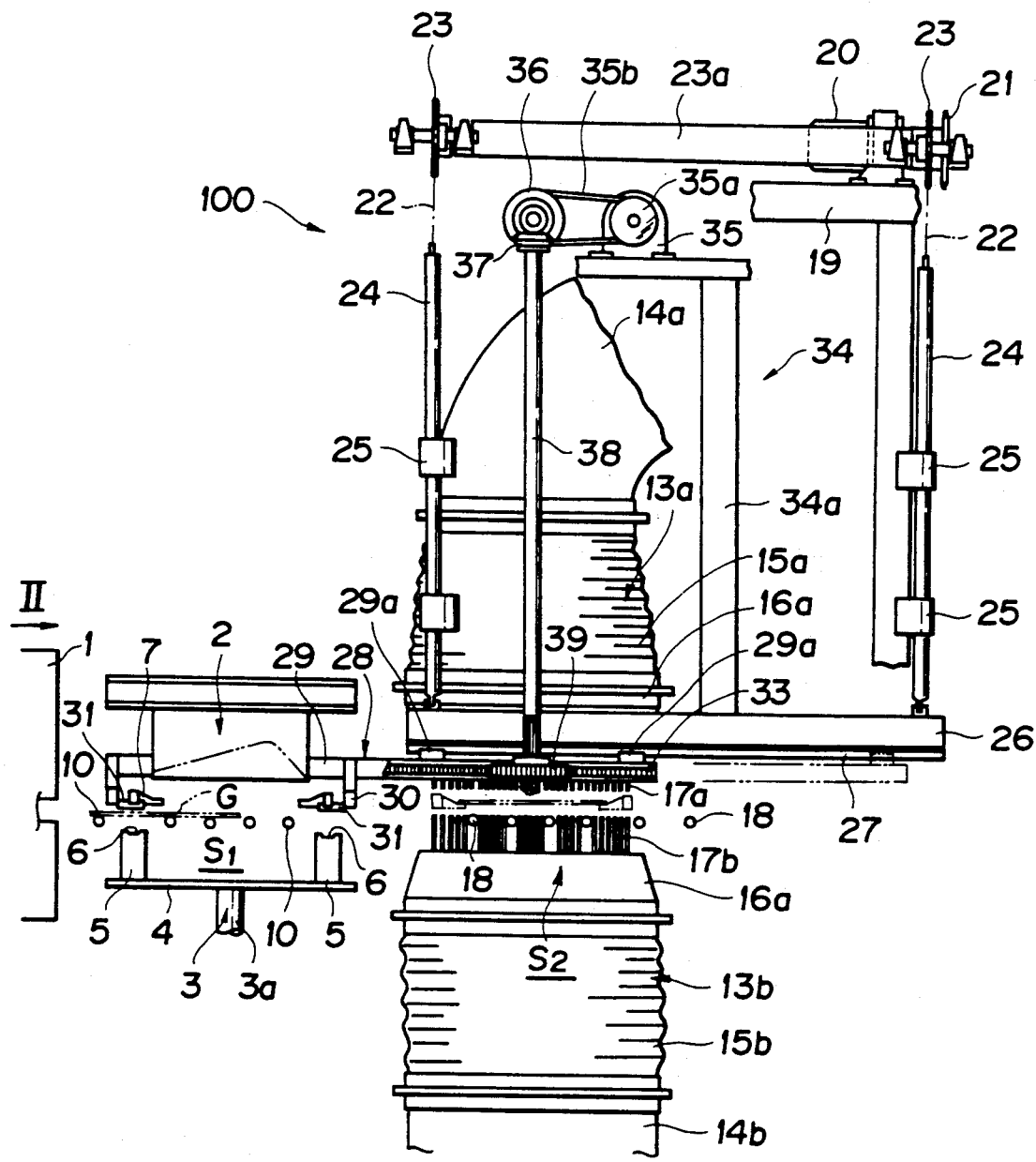
FIG. 1 is a fragmentary side elevational view of a sheet glass bending apparatus according to a preferred embodiment of the present invention.

FIG. 1 shows a sheet glass bending apparatus, generally designated by the reference numeral 100, according to a preferred embodiment of the present invention. A sheet glass G is fed through the sheet glass bending apparatus from the left to the right in FIG. 1. Therefore, the lefthand and righthand sides of FIG. 1 are upstream and downstream sides, respectively, with respect to the direction in which the sheet glass G is fed. The sheet glass bending apparatus 100 includes a heating furnace 1, a pressing stage S1 disposed downstream of the heating furnace 1, and a quenching stage S2 disposed downstream of the pressing stage S1.

The pressing stage S1 has an upper mold 2 having a lower surface which is used as a shaping surface in its entirety, and a lifting/lowering member 3 positioned below the upper mold 2. The lifting/lowering member 3 comprises a support post 3a, a horizontal plate 4 mounted on the upper end of the support post 3a, and four support columns 5 mounted on the upper surface of the horizontal plate 4 respectively at its four corners. The lifting/lowering member 3 can be vertically moved by a cylinder unit (not shown) connected to a lower portion of the support post 3a, Each of the support columns 5 has a bifurcated receiver 6 on its upper end. A ring mold 7 can be positioned by and placed on the receivers 6 of the support columns 5.

Figure 3:
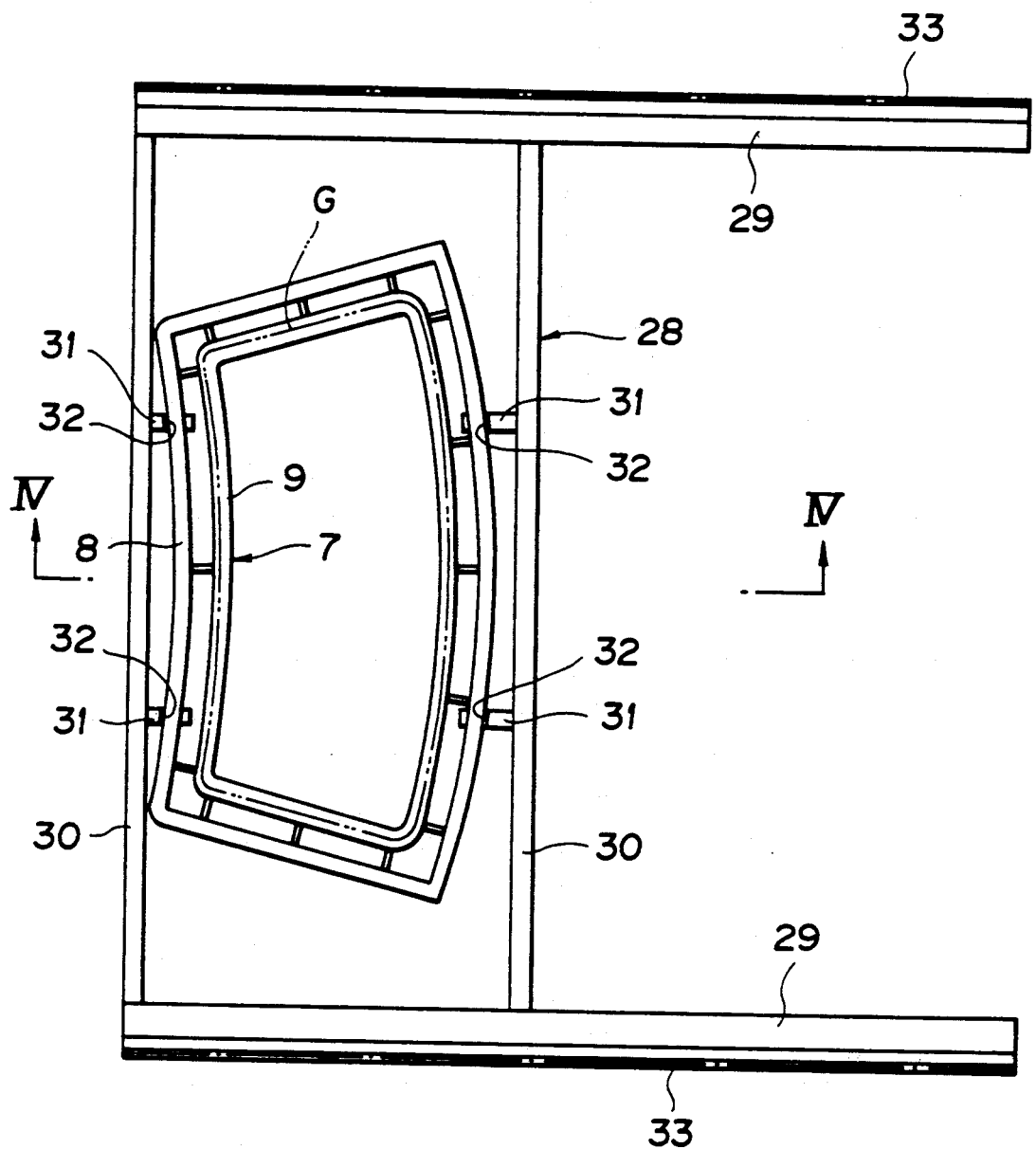
FIG. 3 is a plan view of a shuttle in the sheet glass bending apparatus, with a ring mold placed on the shuttle.
Figure 4:
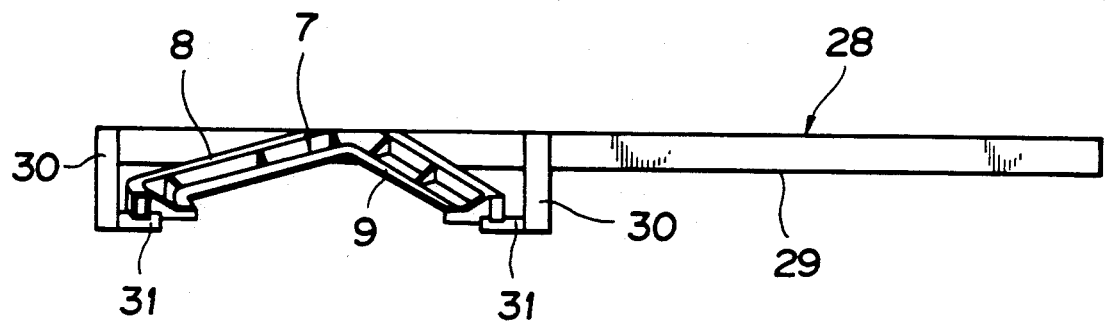
FIG. 4 is a cross-sectional view taken along line IV—IV of FIG. 3.

As shown in FIGS. 3 and 4, the ring mold 7 comprises an outer frame 8 and a support ring 9 disposed in and attached to the outer frame 8, for receiving the peripheral edge of a lower surface of a glass sheet G. The outer frame 8 of the ring mold 7 is placed on the receivers 6 of the lifting/lowering member 3.

Figure 5:
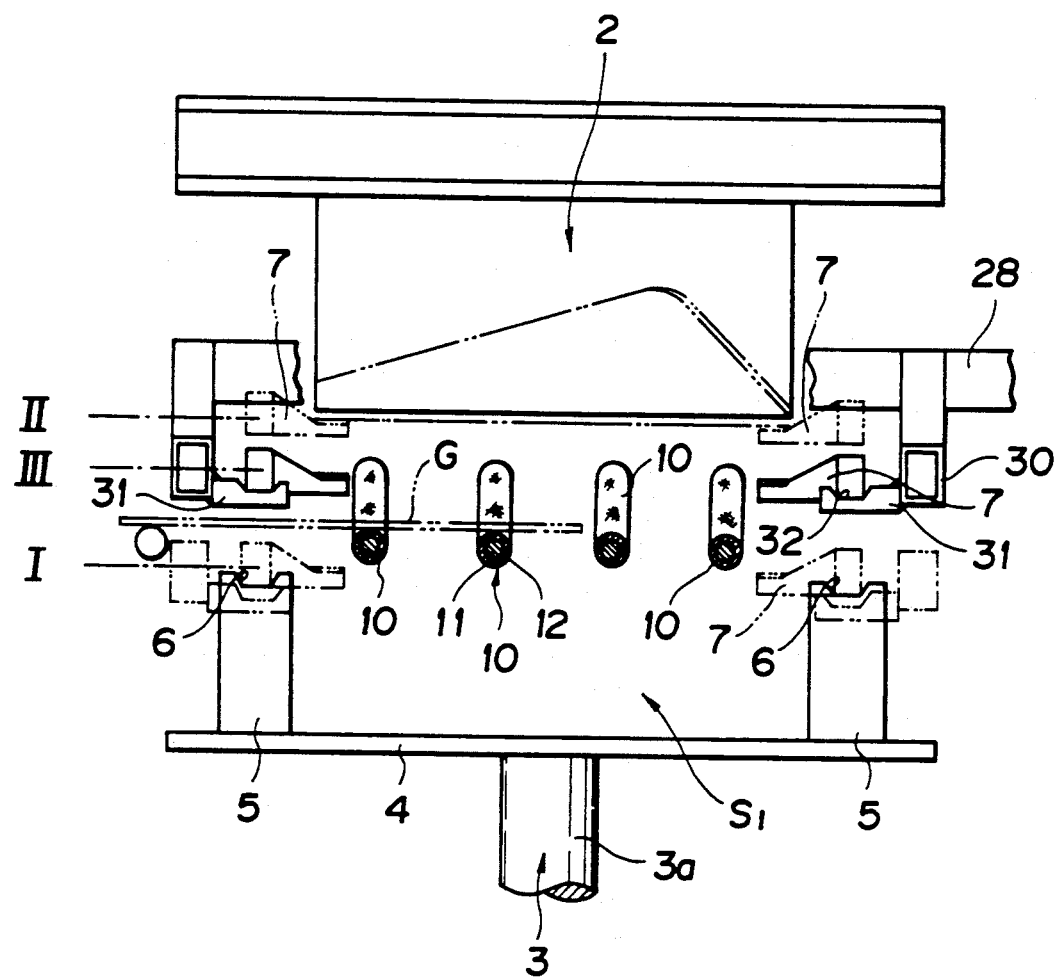
FIG. 5 is an enlarged side elevational view of a pressing stage in the sheet glass bending apparatus.

Between the heating furnace 1 and the pressing stage S1, there is disposed an array of feed rollers 10 for horizontally feeding the glass sheet G which is heated, along a feed path extending along the feed roller array. As shown in FIG. 5, each of the feed rollers 10 comprises a core 11 extending in a direction perpendicular to the feed path for the glass sheet G, and a flexible tube 12 fitted over the core 11, the core 11 being fixed against rotation about its own axis. The flexible tubes 12 of the feed rollers 10 are rotated around the respective cores 11 by a drive mechanism (not shown) to feed the glass sheet G thereon.

Figure 2:
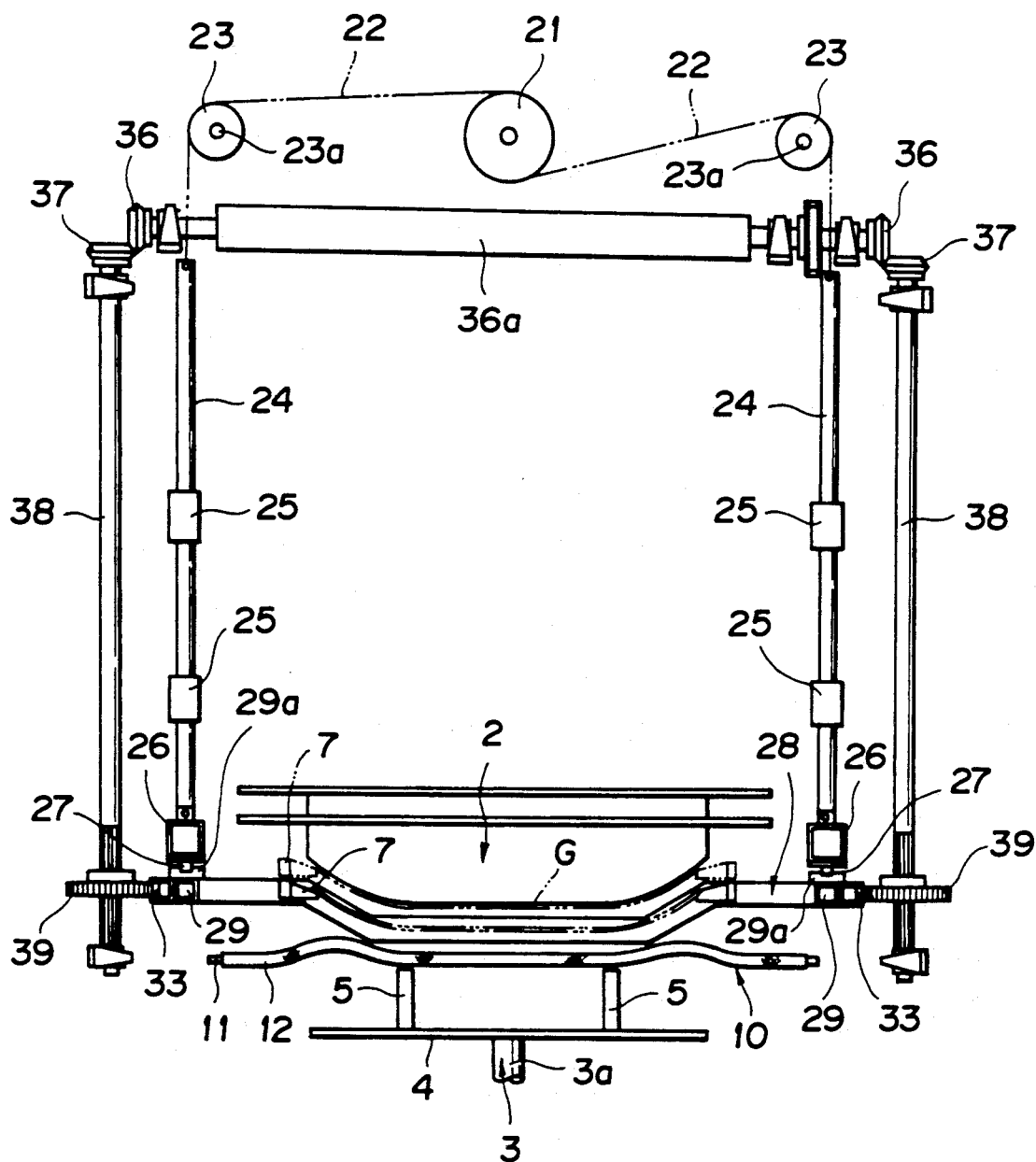
FIG. 2 is an elevational view of the sheet glass bending apparatus, as viewed in the direction indicated by the arrow II in FIG. 1.

As shown in FIG. 2, as viewed along the feed path, each core 11 is shaped like a bow, having a downwardly concave central portion and two upwardly curved portions one on each side of the central position. Therefore, while the glass sheet G from the heating furnace 1 is being fed toward the pressing stage S1 by the feed rollers 10, the glass sheet G is preliminarily shaped by the curved configuration of the cores 11.

Those feed rollers 10 which are positioned directly below the upper mold 2 are downwardly curved, at their portions overlapping the ring mold 7 as viewed in plan, so that these feed rollers 10 will not interfere with the ring mold 7 as it is vertically moved. Instead, these feed rollers 10 may be shorter in the direction across the feed path such that they may be positioned within the support ring 9 of the ring mold 7. Alternatively, the feed rollers 10 may be straight in shape.

The quenching stage S2 (FIG. 1) has upper and lower cooling air ejectors 13a, 13b. The upper and lower cooling air ejectors 13a, 13b comprise ducts 14a, 14b connected to a cool air supply (not shown), boxes 16a, 16b connected to the ducts 14a, 14b through respective bellows 15a, 15b, and arrays of vertical air nozzles 17a, 17b on the lower and upper surfaces of the boxes 16a, 16b which confront a glass sheet G which is positioned in the quenching stage S2. The boxes 16a, 16b are coupled to respective cylinder units (not shown) for vertical positional adjustment thereby.

The sheet glass bending apparatus 100 further includes feed rollers 18 for feeding a glass sheet G, which has been tempered in the quenching stage S2, down to a downstream pickup stage (not shown). The air nozzles 17b of the lower cooling air ejector 13b are spaced such that there are certain wider gaps therebetween for receiving some of the feed rollers 18 in a quenching position.

The sheet glass bending apparatus 100 also has a stationary frame 19 vertically mounted on a floor (not shown) in surrounding relation to the quenching stage S2. A movable frame 34 is vertically movably mounted on the stationary frame 19.

More specifically, a motor 20 is fixedly mounted on the stationary frame 19 at a downstream end of an upper portion thereof, and has a rotatable shaft to which a pulley 21 is fixed. Left and right wires 22 (FIG. 2) have inner ends fastened to the pulley 21 and outer ends trained around left and right pulleys 23, respectively, mounted on the stationary frame 19 and extending downwardly. The lower ends of the wires 22 are connected to the upper ends of left and right connector rods 24. The pulleys 23 are mounted on downstream ends of shafts 23a, respectively, which extend along the feed path. Other pulleys 23 are also mounted on upstream ends of the shafts 23a. Other wires 22 are also trained around the pulleys 23 and extend downwardly, with their lower ends coupled to the upper ends of other left and right connector rods 24. Therefore, a total of four pulleys 23 are mounted on the stationary frame 19 at left and right positions in the front and rear portions thereof. The connector rods 24 are suspended respectively from the wires 22 trained around these pulleys 23. Each of the connector rods 24 is vertically slidably supported in guides 25 attached to the frame 19.

Support bars 26 extending along the feed path are coupled to the lower ends of the right pair of the rods 24, disposed on the righthand side of the feed path, and the lower ends of the left pair of the rods 24, disposed on the lefthand side of the feed path. Rails 27 extending along the feed path are attached to the lower surfaces of the support bars 26, respectively. A shuttle 28 (described below) is slidably engaged and supported by the rails 27.

As shown in FIGS. 3 and 4, the shuttle 28 comprises a pair of laterally spaced, left and right main bars 29 extending along the feed path, and a pair of cross bars 30 extending between and connected to the main bars 29 at upstream end and intermediate portions thereof. The main bars 29 and the cross bars 30 jointly make up a rectangular frame which surrounds the ring mold 7, as viewed in plan, in a certain position in the pressing stage S1, for example. Two support arms 31 are attached to each of the cross bars 30, the support arms 31 projecting inwardly of the rectangular frame. Each of the support arms 31 has a bifurcated receiver 32 on the inner end thereof for positioning the outer frame 8 of the ring mold 7. Racks 33 extend the full length, and are attached to the outer sides, of the main bars 29. In the pressing stage S1, the four support arms 31 of the shuttle 28 are positioned out of vertical alignment with the four support columns 5 of the lifting/lowering member 3, and also positioned in vertically underlying relation to the outer frame 8 of the ring mold 7.

As shown in FIG. 1, a support column 34a with a motor 35 mounted on its upper end is vertically mounted on the support bar 26 which is shown on the righthand side in FIG. 2. The motor 35 has an output pulley 35a. A belt 35b is trained around the output pulley 35a and a helical gear 36 mounted on one end of a shaft 36a which extends laterally and is supported on the movable frame 34. Another helical gear 36 is mounted on the other end of the shaft 36a. The helical gears 36 on the opposite ends of the shaft 36a are held in driving mesh with helical gears 37, respectively, on the upper ends of vertical shafts 38 on the left and right sides of the movable frame 34. The vertical shafts 38 support gears 39 splined to their lower ends and held in mesh with the racks 33, respectively, attached to the main bars 29.

As can be understood from the foregoing description, the vertically movable frame 34 are composed of the support bars 26, the support column 34a, etc., and can be moved vertically when the connector rods 24 are lifted or lowered by the motor 20. The shuttle 28 is movably attached to the movable frame 34 for movement along the feed path. When the motor 35 is energized under the control of a control mechanism (not shown), the shuttle 28 is reciprocally moved between the pressing stage S1 and the quenching stage S2.

Operation of the sheet glass bending apparatus 100 will now be described with reference to FIG. 5.

The various steps of operation, described below, are carried out when the feed rollers 10, the lifting/lowering member 3, the upper mold 2, the shuttle 28, and so on are driven under the control of the control mechanism.

Initially, the ring mold 7, which is positioned on the receivers 6 of the lifting/lowering member 3, is lowered in a standby position I which is lower than the upper surfaces of the feed rollers 10. Similarly, the shuttle 28 is also lowered in a standby position slightly below the ring mold 7 so as to be aligned with the ring mold 7 in the vertical direction.

A glass sheet G, which has been heated in the heating furnace 1, is fed to the pressing stage S1 by the feed rollers 10, during which time the glass sheet G is preliminarily shaped by the feed rollers 10. Upon detection by a suitable sensor of arrival of the glass sheet G at a position aligned with the ring mold 7, the rotation of the feed rollers 10 is stopped to hold the glass sheet G at rest. Then, the lifting/lowering member 3 is elevated to lift the ring mold 7 from the standby position I to an uppermost pressing position II. When the ring mold 7 reaches the pressing position II, the upward movement of the lifting/lowering member 3 is stopped. While the ring mold 7 is ascending toward the pressing position II, the support ring 9 of the ring mold 7 receives the glass sheet G from the feed rollers 10.

In the pressing position II, the upper mold 2 is lowered to press the glass sheet G to a bent shape between the ring mold 7 and the upper mold 2. While the glass sheet G is being thus bent, the shuttle 28 is lifted to a certain level. Specifically, the shuttle 28 is elevated to a ring mold receiving position III in which the cross bars 30 of the shuttle 28 can receive the ring mold 7 from the lifting/lowering member 3.

After the glass sheet G has been bent, the lifting/lowering member 3 is moved downwardly to its lowermost position at a low speed. The peripheral edge of the lower surface of the bent glass sheet G remains supported on the support ring 9 of the ring mold 7. Upon descent of the lifting/lowering member 3, the ring mold 7 supported on the lifting/lowering member 3 is also moved downwardly therewith. Therefore, the ring mold 7 which supports the glass sheet G is transferred from the lifting/lowering member 3 to the bifurcated receivers 32 of the support arms 31 of the shuttle 28 in the ring mold receiving position III. More specifically, the outer frame 8 of the ring mold 7 is fitted in the bifurcated receivers 32 of the support arms 31. The transfer of the ring mold 7 is carried out by only the relative vertical movement of the lifting/lowering member 3 and the shuttle 28.

Thereafter, the motor 35 is energized to move the shuttle 28, which has just received the ring mold 7, from the pressing stage S1 to the quenching stage S2. The ring mold 7 with the glass sheet G supported thereon is now positioned between upper and lower cooling air ejectors 13a, 13b. Then, cooling air is ejected from the upper and lower air nozzles 17a, 17b toward the glass sheet G, thereby quenching and tempering the glass sheet G.

Then, the box 16b of the lower cooling air ejector 13b is lowered, and the movable frame 34 is lowered by the motor 20. The tempered glass sheet G on the ring mold 7 supported on the shuttle 28 is now transferred onto the feed rollers 18. The glass sheet G is then fed to the downstream pickup stage by the feed rollers 18.

Thereafter, the movable frame 34 is moved upwardly thereby to lift the shuttle 28, and the shuttle 28 is then moved back from the quenching stage S2 to the pressing stage G1. The movable frame 34 is lowered to lower the shuttle 28 to the initial standby position. Upon such downward movement, the ring mold 7 is transferred from the shuttle 28 onto the receivers 6 of the lifting/lowering member 3.

In the two-stage-type sheet glass bending apparatus 100, the ring mold 7 for supporting the lower surface of the glass sheet G is shared by the pressing stage S1 and the quenching stage S2. Therefore, the number of parts of the apparatus is prevented from increasing. Since it is not necessary to transfer a glass sheet from one ring mold to another, the peripheral edge of the glass sheet is less liable to be cracked or distorted.

The shuttle 28, serving as a feed jig, and the shaping ring mold 7 are not mechanically fixed to each other, but the ring mold 7 is simply placed on the support arms 31 of the shuttle 28. Therefore, even if the shuttle 28 is deformed due to temperature changes, the ring mold 7 is not deformed thereby.

The ring mold 7 is transferred between the lifting/lowering member 3 and the shuttle 28 by only relative movement of the lifting/lowering member 3 and the shuttle 28. Accordingly, the ring mold 7 is not subject to any physical forces which would otherwise tend to deform the ring mold 7.

The shuttle 28 is not limited to the illustrated configuration. According to a modification, the cross bars 30 may be dispensed with, and support arms may be attached to the main bars 29, so that the opposite sides of the ring mold 7 may be received by these support arms. With such an alternative, it is not necessary to initially position the shuttle 28 below the ring mold 7.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

We claim:

1. In an apparatus for bending a glass sheet, having a pressing stage disposed downstream of a heating furnace and a quenching stage disposed downstream of the pressing stage, the improvement comprising:
    a ring mold for supporting a peripheral edge of a lower surface of a glass sheet;
    a lifting/lowering member disposed in the pressing stage, for engaging said ring mold from below and vertically moving the ring mold; and
    a shuttle including support members positioned to support the periphery of said ring mold from below and disposed between the pressing stage and the quenching stage and reciprocally movable therebetween in a horizontal plane while holding the ring mold, said shuttle being positioned and operable to receive the ring mold from and transfer the ring mold to said lifting/lowering member.

2. An apparatus for bending a glass sheet comprising:
    a heating furnace for heating a glass sheet;
    a pressing stage disposed downstream of said heating furnace;
    a quenching stage disposed downstream of said pressing stage;
    a first feed mechanism for horizontally feeding the glass sheet from said heating furnace to said pressing stage;

a ring mold for receiving the glass sheet from said first feed mechanism in said pressing stage such that the ring mold supports a peripheral edge of a lower surface of the glass sheet;

an upper mold operable with said ring mold for pressing the glass sheet to a bent shape;

a second feed mechanism comprising a shuttle including support members for supporting the ring mold from below, the shuttle feeding the ring mold, which supports the glass sheet pressed in said pressing stage, horizontally to said quenching stage from the pressing stage;

a quenching device for quenching and tempering the glass sheet in said quenching stage; and a third feed mechanism for receiving the glass sheet, which has been tempered in said quenching stage, from said ring mold and for feeding the glass sheet downstream of said quenching stage;

said ring mold being movable horizontally back to said pressing stage by said second feed mechanism after the ring mold has transferred the glass sheet to said third feed mechanism in said quenching stage.

3. An apparatus according to claim 2, further including a lifting/lowering mechanism in said pressing stage disposed below said ring mold for lifting said ring mold from below said first feed mechanism, to enable said ring mold to receive the glass sheet from said first feed mechanism.

4. An apparatus according to claim 3, wherein said support members of said shuttle are disposed in underlying relation to portions of said ring mold as viewed in plane, in said pressing stage.

5. An apparatus according to claim 4, wherein said lifting/lowering mechanism lifts said ring mold from a standby position lower than said glass sheet on said first feed mechanism to a pressing position above said first feed mechanism in said pressing stage, thereby transferring said glass sheet from said first feed mechanism to said ring mold, and said lifting/lowering mechanism lowers said ring mold from said pressing position in said pressing stage after the glass sheet has been pressed, and wherein said shuttle receives said ring mold from said lifting/lowering mechanism in a ring mold receiving position between said pressing position and said first feed mechanism while said ring mold is being lowered by said lifting/lowering mechanism.

* * * * *

UNITED STATES PATENT AND TRADEMARK OFFICE
CERTIFICATE OF CORRECTION

PATENT NO. : 5,059,234
DATED : October 22, 1991
INVENTOR(S) : Hideo Yoshizawa et al.

It is certified that error appears in the above-identified patent and that said Letters Patent is hereby corrected as shown below:

Column 8, claim 4, line 8, "plane" should read --plan--.

Signed and Sealed this

Twentieth Day of April, 1993

*Attest:*

MICHAEL K. KIRK

*Attesting Officer*   Acting Commissioner of Patents and Trademarks